United States Patent [19]
Gill

[11] Patent Number: 6,061,210
[45] Date of Patent: May 9, 2000

[54] ANTIPARALLEL PINNED SPIN VALVE WITH HIGH MAGNETIC STABILITY

[75] Inventor: Hardayal Singh Gill, Portola Valley, Calif.

[73] Assignee: International Business Machines Corporation, Armonk, N.Y.

[21] Appl. No.: 08/934,523

[22] Filed: Sep. 22, 1997

[51] Int. Cl.[7] .................................................. G11B 5/39
[52] U.S. Cl. ................................................................ 360/113
[58] Field of Search ............................ 360/113; 338/32 R

[56] References Cited

U.S. PATENT DOCUMENTS

| | | | |
|---|---|---|---|
| 4,547,824 | 10/1985 | Best et al. | 360/113 |
| 5,508,867 | 4/1996 | Cain et al. | 360/113 |
| 5,515,221 | 5/1996 | Gill et al. | 360/113 |
| 5,546,254 | 8/1996 | Gill | 360/113 |
| 5,563,752 | 10/1996 | Komuro et al. | 360/113 |
| 5,568,335 | 10/1996 | Fontana et al. | 360/113 |
| 5,576,914 | 11/1996 | Rottmayer et al. | 360/113 |
| 5,638,235 | 6/1997 | Gill et al. | 360/113 |
| 5,654,854 | 8/1997 | Mallary | 360/113 |
| 5,657,190 | 8/1997 | Araki et al. | 360/113 |
| 5,696,656 | 12/1997 | Gill et al. | 360/113 |
| 5,701,223 | 12/1997 | Fontana, Jr. et al. | 360/113 |
| 5,705,973 | 1/1998 | Yuan et al. | 338/32 R |
| 5,748,399 | 5/1998 | Gill | 360/66 |
| 5,768,069 | 6/1998 | Mauri | 360/113 |
| 5,768,071 | 6/1998 | Lin | 360/113 |

FOREIGN PATENT DOCUMENTS

| | | |
|---|---|---|
| 52-11019 | 1/1977 | Japan . |
| 58-220240 | 12/1983 | Japan . |
| 59-84328 | 5/1984 | Japan . |
| 59-172109 | 9/1984 | Japan . |
| 5-46946 | 2/1993 | Japan . |
| 9-073607 | 3/1997 | Japan . |
| 409204611 A | 8/1997 | Japan . |

OTHER PUBLICATIONS

"Spin Valve/Giant Magneto Resistive Sensor Magnetic Stabilization", *IBM Technical Disclosure Bulletin*, vol. 39, No. 10, Oct. 1996, pp. 123–124.

"Micromagnetics and Signal Analysis of Shielded Spin--Valve Multilayer", *Chinese Physics Letters*, vol. 13, No. 6, 1996, pp. 469–472.

*Primary Examiner*—Jefferson Evans
*Attorney, Agent, or Firm*—Gray Cary Ware & Freidenrich LLP; Ervin F. Johnston

[57] ABSTRACT

A magnetic head is provided that includes a spin valve sensor, first and second leads for conducting a sense current through the spin valve sensor, first and second gap layers and first and second shield layers wherein the spin valve sensor is sandwiched between the first and second gap layers and the first and second gap layers are sandwiched between the first and second shield layers. The spin valve sensor includes a free layer, an antiparallel (AP) pinned layer and a nonmagnetic electrically conductive spacer film. The AP pinned layer includes first and second ferromagnetic thin films and a nonmagnetic electrically conductive spacer layer wherein the spacer film is sandwiched between the first and second films. The spacer layer is sandwiched between the free layer and the pinned layer and the first and second gap layers are sized so that the free layer is located closer to one of the first and second shield layers than to the other so that a net image sense current field promotes magnetic stability of the free layer.

32 Claims, 11 Drawing Sheets

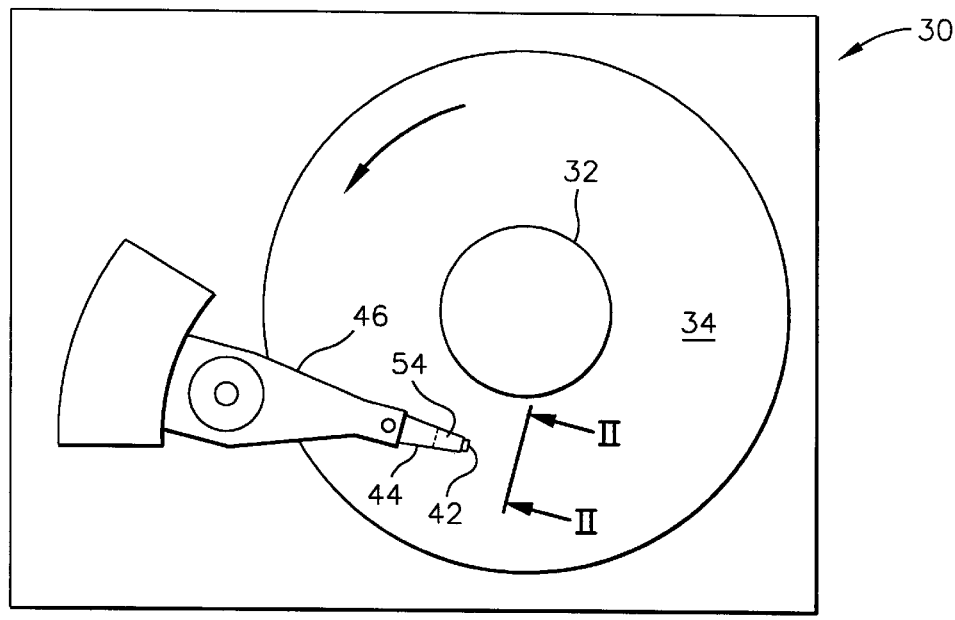
FIG. 1
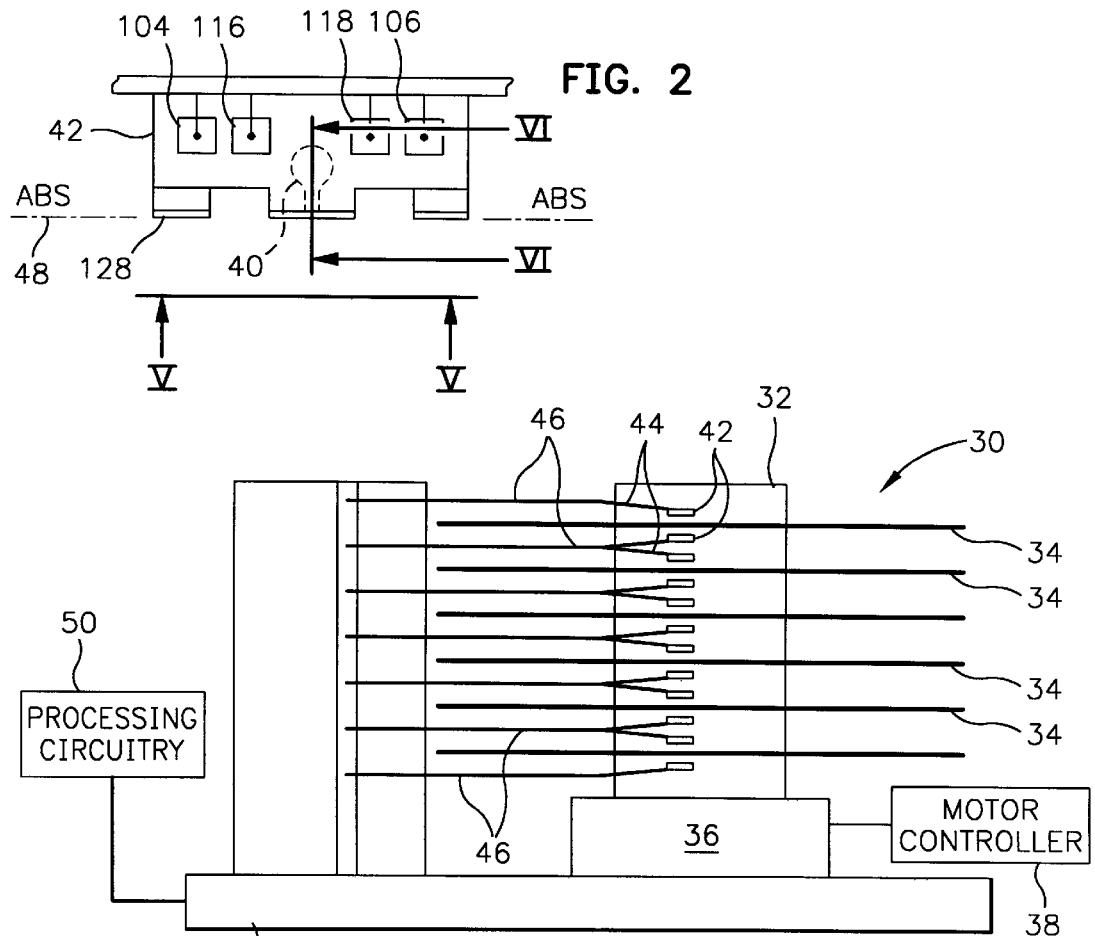
FIG. 2
FIG. 3

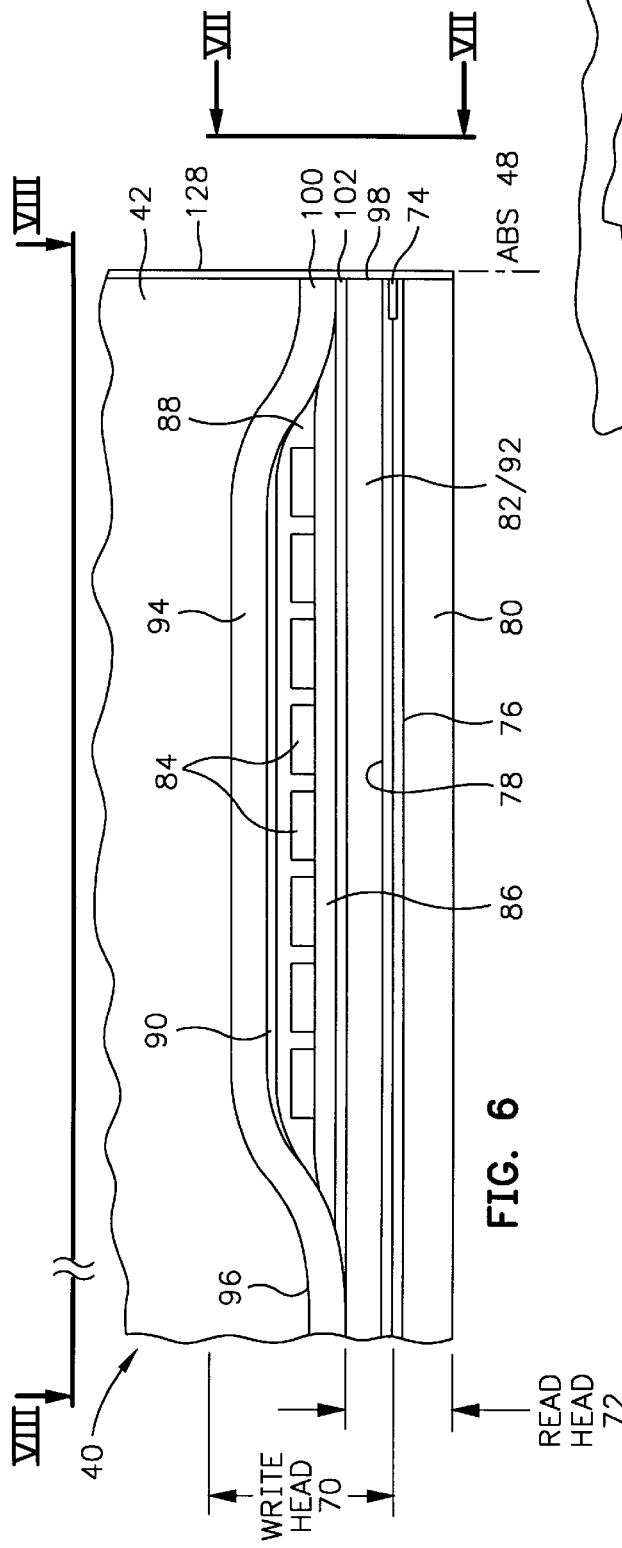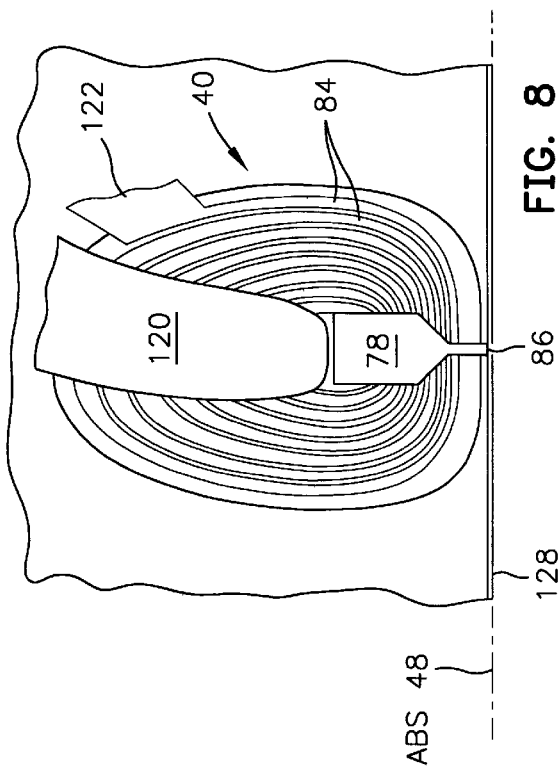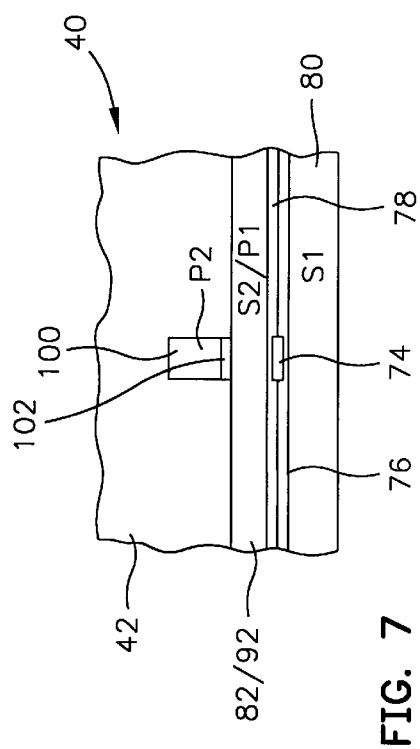

(ABS)

(ROTATED 90°)

($H_{SC}$)

($H_{AMR\ EFFECT}$)

($H_{AMR\ EFFECT} - H_{SC}$)

(ABS)

(ROTATED 90°)

(ABS)

FIG. 19 (ROTATED 90°)

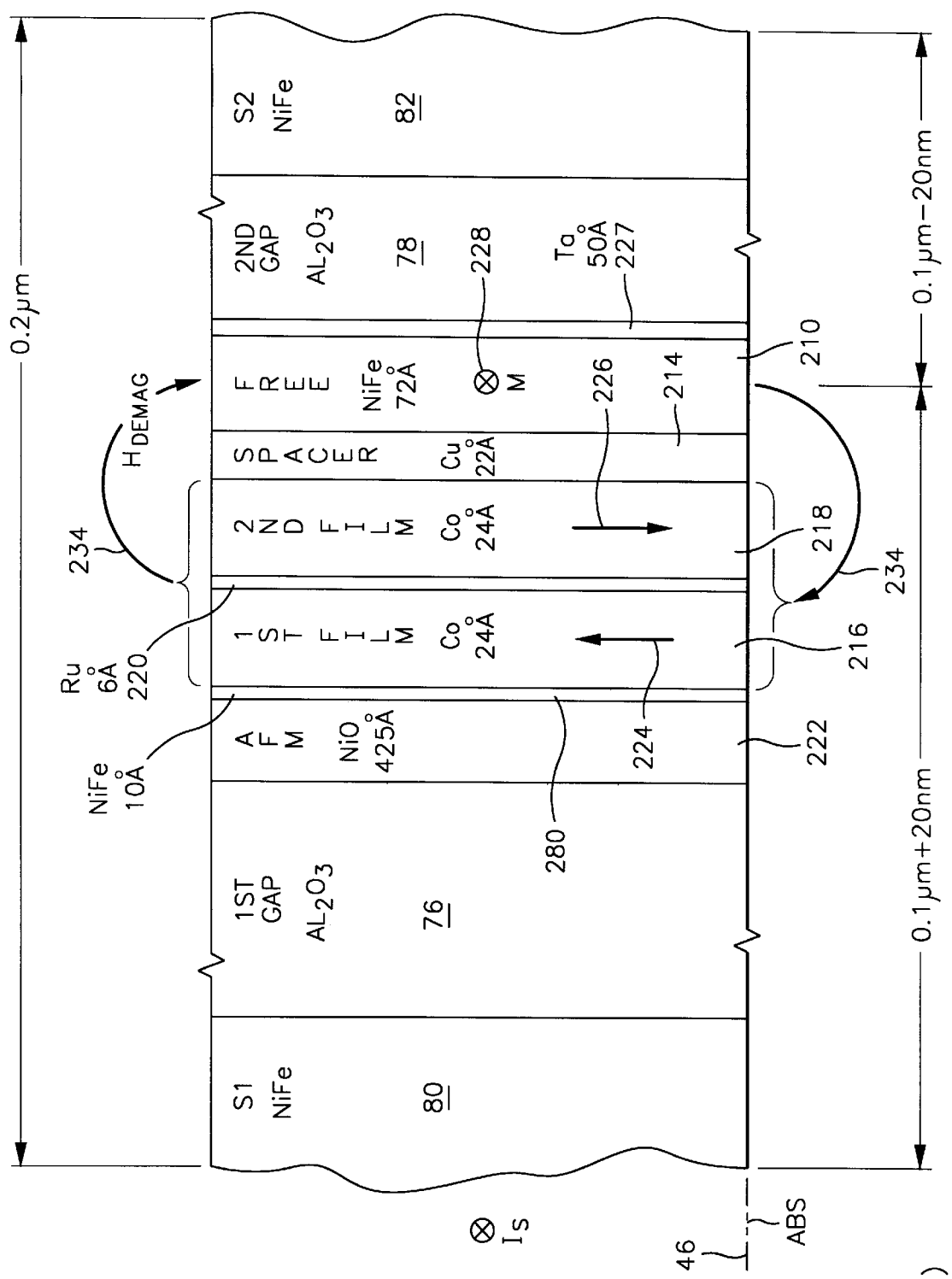
FIG. 22 (ROTATED 90°)

ANTIPARALLEL PINNED SPIN VALVE WITH HIGH MAGNETIC STABILITY

RELATED ART

This application is related to my commonly assigned patent application Ser. No. 08/841,182 filed Apr. 29, 1997.

BACKGROUND OF THE INVENTION

1. Field of the Invention

The present invention relates to an antiparallel pinned spin valve read head wherein magnetic and anisotropic magnetoresistive (AMR) influences on the free layer of an antiparallel pinned spin valve are balanced so as to promote high magnetic stability of the free layer.

2. Description of the Related Art

A spin valve sensor is employed by a read head for sensing magnetic fields from moving magnetic media, such as a magnetic disk or a magnetic tape. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned 90° to the magnetization of the free layer and the magnetization of the free layer is free to respond to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons are scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in the scattering of the conduction electrons changes the resistance of the spin valve sensor in proportion to $\sin \theta$, where $\theta$ is the angle between the magnetizations of the pinned and free layers. A spin valve sensor has a very high magnetoresistive (MR) coefficient, substantially higher than an anisotropic magnetoresistive (AMR) sensor. For this reason it is sometimes referred to as a giant magnetoresistive (GMR) sensor.

A read head employing a spin valve sensor (hereinafter referred to as a "spin valve read head") may be combined with an inductive write head to form a combined magnetic head. The combined magnetic head may have the structure of either a merged head, or a piggyback head. In a merged head a single layer serves as a shield for the read head and as a first pole piece for the write head. A piggyback head has a separate layer which serves as the first pole piece for the write head. In a magnetic disk drive an air bearing surface (ABS) of the combined magnetic head is supported adjacent a rotating disk to write information on or read information from the disk. Information is written to the rotating disk by magnetic fields which fringe across a gap between the first and second pole pieces of the write head. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

An improved spin valve, which is referred to hereinafter as antiparallel pinned (AP) spin valve, is described in commonly assigned U.S. Pat. No. 5,465,185 to Heim and Parkin which is incorporated by reference herein. The AP spin valve differs from the spin valve described above in that the pinned layer comprises multiple thin films, hereinafter referred to as AP pinned layer. The AP pinned layer has a nonmagnetic spacer film which is sandwiched between first and second ferromagnetic thin films. The first thin film, which may comprise several thin films, is immediately adjacent to the antiferromagnetic layer and is exchange-coupled thereto, with its magnetic moment directed in a first direction. The second thin film is immediately adjacent to the free layer and is exchange-coupled to the first thin film by the minimal thickness (in the order of 6 Å) of the spacer film between the first and second thin films. The magnetic moment of the second thin film is oriented in a second direction that is antiparallel to the direction of the magnetic moment of the first film. The magnetic moments of the first and second films subtractively combine to provide a net moment of the AP pinned layer. The direction of the net moment is determined by the thicker of the first and second thin films. The thicknesses of the first and second thin films are chosen so that the net moment is small. A small net moment equates to a small demagnetization (demag) field from the AP pinned layer. Since the antiferromagnetic exchange coupling is inversely proportional to the net moment, this results in a large exchange coupling.

A large exchange coupling promotes higher thermal stability of the head. When the head encounters high heat conditions due to electrostatic discharge from an object, or due to contacting an asperity on the magnetic disk, a critical high temperature of the antiferromagnetic layer, hereinafter referred to as blocking temperature, can be exceeded, causing it to lose its directed magnetic moment. The magnetic moment of the AP pinned layer is then no longer pinned in the desired direction. In this regard, significant advantages of the AP pinned spin valve over the typical single film pinned layer are a greater exchange coupling field and a lower demag field, which enhance thermal stability of the spin valve sensor.

In the prior art, free layers have been constructed with thicknesses of 50 Å to optimize the giant magnetoresistive (GMR) coefficient of the spin valve sensor. It would be desirable if this thickness could be increased to about 100 Å for the purpose of enhancing manufacturing yield with only about a 20% sacrifice in the GMR coefficient. A 100 Å thick free layer, however, can increase an AMR effect (ratio of change in resistance of the free layer to resistance of the free layer $\Delta r/R$) on the spin valve sensor to almost 1%. Unfortunately, the AMR effect seriously affects the position of the bias point of the spin valve head relative to positive and negative readback signals detected by the spin valve head, the bias point being a point on a transfer curve (readback signal of the spin valve sensor versus applied signal from the magnetic disk) of the spin valve sensor which will be described in more detail hereinafter. The AMR effect is employed in the aforementioned AMR sensor for detecting signals and is due to a change in resistance of an MR stripe in response to magnetic fields from a rotating disk. The free layer in a spin valve sensor demonstrates this same AMR effect which must be dealt with in establishing the bias point.

The transfer curve for a spin valve sensor is linear and is defined by $\sin \theta$ where $\theta$ is the angle between the directions of the magnetic moments of the free and pinned layers. With positive and negative magnetic fields from a moving magnetic disk, which are typically chosen to be equal in magnitude, it is desirable that positive and negative changes in the GMR of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk.

As indicated hereinabove it is desirable that the transfer curve for the sensor be symmetrically located with respect to the bias point for producing symmetrical positive and negative readback signals. This means that the bias point should be located midway between the top and bottom of the transfer curve. The designer strives to improve asymmetry of the readback signals as much as practical with the goal being symmetry. When the readback signals are asymmetrical, signal output and dynamic range of the sensor are reduced. Asymmetry improvement is easier to achieve with spin valve sensors that do not employ an AP pinned layer. Unfortunately, the free layer of the AP pinned spin valve has additional forces acting on it that displace the transfer curve relative to the bias point. These forces are addressed in the next paragraph.

The location of the transfer curve relative to the bias point is influenced by four major forces on the free layer, namely a ferromagnetic coupling field $H_{FC}$ between the pinned layer and the free layer, a demag field $H_{demag}$ on the free layer from the pinned layer, a sense current field $H_{SC}$ from all conductive layers of the spin valve except the free layer and the aforementioned influence of the AMR. The influence of the AMR on the bias point is the same as a magnetic influence thereon and can be defined in terms of magnitude and direction and is referred to herein as the AMR EFFECT. There is a need to deal with all of these forces on the free layer so as to improve asymmetry of the readback signals.

SUMMARY OF THE INVENTION

Upon investigating the AP pinned spin valve I have found that, when the sense current is conducted in a first direction through the spin valve read head, the direction of the fields $H_{demag}$ and $H_{FC}$ are antiparallel to the direction of the field $H_{SC}$ and the influence of the AMR EFFECT. Since $H_{demag}$ is very low in the AP pinned spin valve, the AMR EFFECT overpowers the antiparallel fields $H_{demag}$ and $H_{FC}$ to displace the transfer curve relative to the bias point, resulting in asymmetry of the readback signals.

Upon further investigation I found that, by reversing the direction of the sense current, I can employ the sense current field $H_{SC}$ to counterbalance the influence of the AMR EFFECT on the transfer curve. When the sense current is reversed from the aforementioned first direction, the direction of the influence of the AMR EFFECT on the free layer is antiparallel to the influence of the fields $H_{SC}$, $H_{demag}$ and $H_{FC}$ on the free layer. The direction and the magnitude of the sense current $I_S$ through the spin valve read head is chosen so that the combined influence of $H_{SC}$, $H_{demag}$ and $H_{FC}$ counterbalances the influence of the AMR EFFECT, thereby improving the position of the bias point between the positive and negative readback signals.

As stated in my copending application. testing of the AP pinned spin valves from first and second investigations showed an improvement of readback asymmetry from −40% in the first investigation to +10% in the second investigation where the readback asymmetry is defined as $$\frac{V_1 - V_2}{\max(V_1 \text{ or } V_2)}.$$

+10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will, of course, reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry.

I found that there is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. I further found that magnetic instability of the free layer is greater when the readback asymmetry is positive. Accordingly, the magnetic instability of the free layer is greater when the readback asymmetry is +10% than when the readback asymmetry is −10%. The +10% readback asymmetry can be improved by changing thickness of the magnetic layers and/or changing the sense current, however, a change of one of these parameters can change other parameters making it a trial and error process to reduce the asymmetry. More importantly, however, is that the channel electronics of the disk drive as well as specific thicknesses of the magnetic layers are designed to satisfy other magnetic considerations. Since these values are set it is manifest that there is a need to deal with the many magnetic and AMR effect influences on the free layer of the AP pinned spin valve so that the net value of these influences on the free layer can be reduced to virtually zero thereby reducing the +10% asymmetry to virtually zero.

Upon further investigation I found that I can employ the image sense current fields from the first and second shield layers for balancing out the net magnetic and AMR effect influences on the free layer. When the sense current is applied to the AP pinned spin valve sensor there is an image sense current in each of the first and second shield layers. The image sense current field in each shield layer causes the shield layer to produce an image sense current field which traverses the free layer in a direction that is substantially perpendicular to the ABS. When the free layer of the AP pinned spin valve is symmetrically located (midway between) the first and second shield layers the image sense current fields counterbalance each other so that the net image sense current field at the free layer is zero. By asymmetrically locating the free layer between the first and second shield layers I can obtain a net image sense current field which can be employed for counterbalancing the net magnetic and AMR effect influences on the free layer. I accomplish this by sizing the first and second gap layers that separate the free layer from the first and second shield layers respectively so that the free layer is closer to a selected one of the shield layers. In my preferred embodiment the second gap is thinner than the first gap layer so that the free layer is closer to the second shield layer. When these thicknesses are carefully selected readback asymmetry can be improved to virtually zero so that magnetic stability of the free layer is optimized. Another option is to invert the placement of the AP pinned spin valve sensor between the shields and make the first gap layer thinner than the second gap layer. This becomes a problem in making the read head since the first gap layer is purposely overmilled during defining the shape of the AP pinned spin valve sensor. If the first gap layer is made thicker to account for this overmilling it increases the distance between the shield layers which defines the trackwidth of the read head. This is not desirable because any increase in the distance between the shield layers reduces the resolution of the read head.

I have found that a very small change in the thicknesses of the first and second gap layers will produce a net image sense current field that will counterbalance the net influence of other magnetic fields and the AMR effect on the free layer. In a total read gap of 0.20 $\mu$m I reduced the thickness of the second gap layer by 20 nanometers (nm) and increased the thickness of the first gap layer by 20 nm. With this arrangement the readback asymmetry was reduced by 8% which reduced the standard deviation of the magnetic instability by 1.5%. By making the first gap layer still slightly thicker and the second gap layer still slightly thinner these values can be increased until negative readback asymmetry is obtained. As indicated above a slight negative readback asymmetry is preferred to a slight positive read asymmetry because of the lower impact on the magnetic stability of the free layer. It can now be seen that near zero readback asymmetry can more easily be achieved by sizing the first and second gap layers than by changing the sense current or the thicknesses of the magnetic layers of the AP pinned spin valve. Accordingly, the AP pinned spin valve can be built according to the teachings of my copending application and any net influence on the free layer can be counterbalanced by a net image sense current field from the shield layers.

An object of the present invention is to improve the magnetic stability of the free layer of an AP pinned spin valve.

Another object is to improve readback asymmetry of an AP pinned spin valve sensor without changing the sense current or thicknesses of the magnetic layers of the sensor.

A further object is to employ a net image sense current field to counterbalance any net magnetic fields and AMR influence on the free layer.

Other objects and attendant advantages of the invention will be appreciated upon reading the following description taken together with the drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane II—II;

FIG. 3 is an elevation view of the magnetic disk drive wherein multiple disks and magnetic heads are employed;

FIG. 6 is a partial view of the slider and magnetic head as seen in plane VI—VI of FIG. 2;

FIG. 7 is a partial ABS view of the slider taken along plane VII—VII of FIG. 6 to show the read and write elements of the magnetic head;

FIG. 8 is a view taken along plane VIII—VIII of FIG. 6 with all material above the second pole piece removed;

FIG. 22 is a side cross sectional illustration of a specific example of the present AP pinned spin valve sensor.

DESCRIPTION OF THE PREFERRED EMBODIMENT

Figure 16:
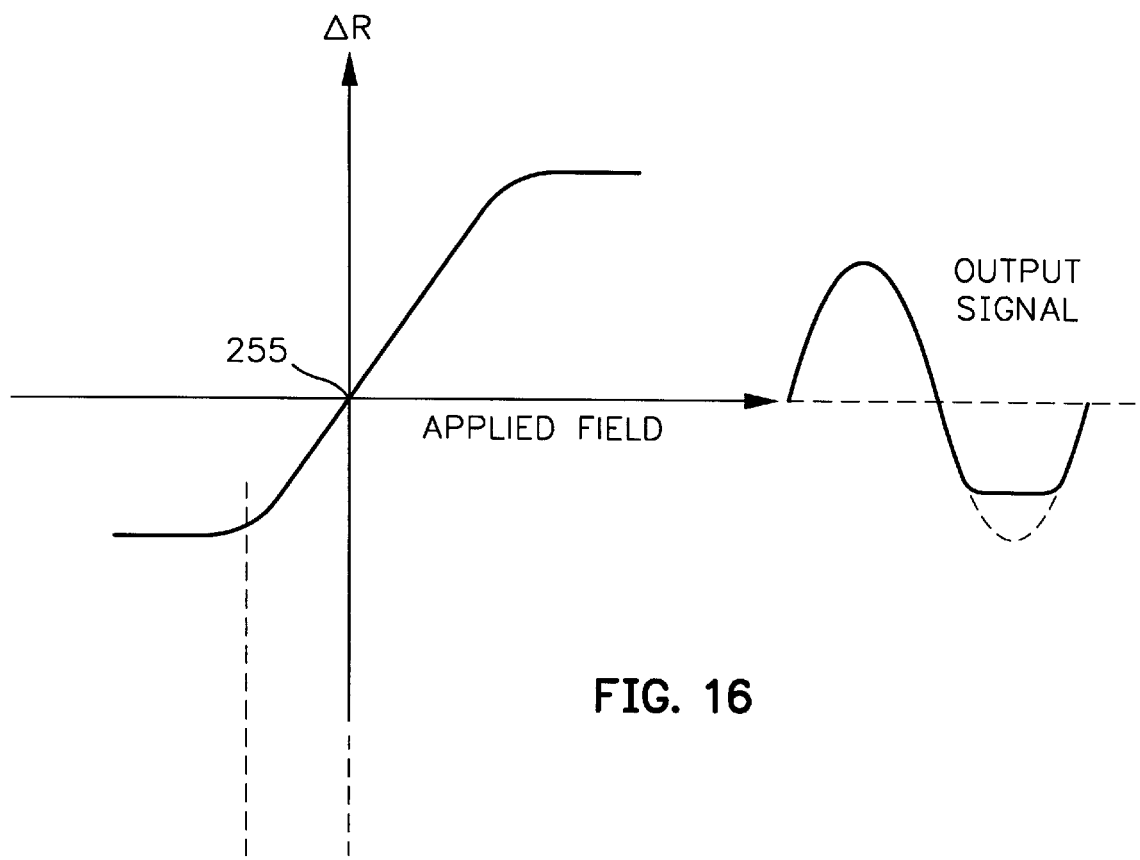
FIG. 16 is a transfer curve and output readback signal curve for the AP pinned spin valve sensor shown in FIGS. 14 and 15.

Three distinct investigations lead to the present invention. These investigations will be discussed separately. Further, the invention is employed in a magnetic disk drive which will also be discussed separately. The first discussion will be of the Magnetic Disk Drive. Next, is the discussion of the "First Investigation" of the AP pinned spin valve sensor that showed −40% readback asymmetry, followed by the "Second Investigation" of the sensor that lead to +10% readback asymmetry and finally the "Third Investigation—The Invention" that reduced the +10% readback asymmetry to near zero. The +10% asymmetry is shown in FIG. 16 by an exaggerated positive transfer curve. In some applications the positive portion of the applied signal, shown in FIG. 17, can saturate the free layer 210 causing magnetic instability of the free layer which will be discussed hereinbelow. FIG. 16 also shows that the negative readback signal can be clipped so that it is short of its full negative range.

Magnetic Disk Drive

Figure 4:
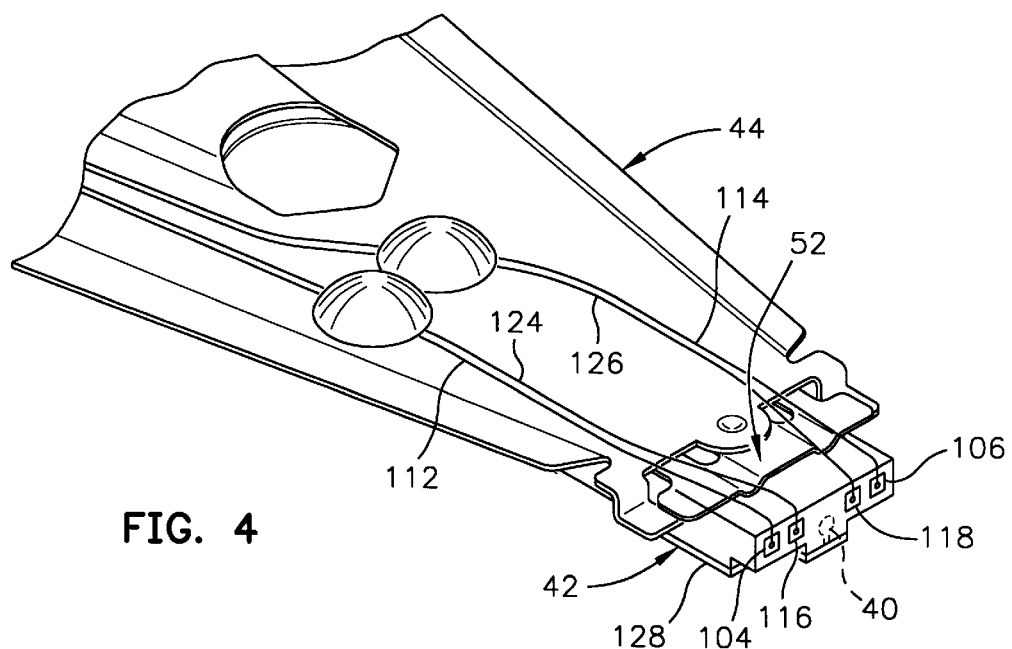
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a head gimbal assembly (HGA) 52 which, in turn, is mounted to the suspension 44. The components described hereinabove may be mounted on a frame 54, as shown in FIG. 3.

Figure 5:
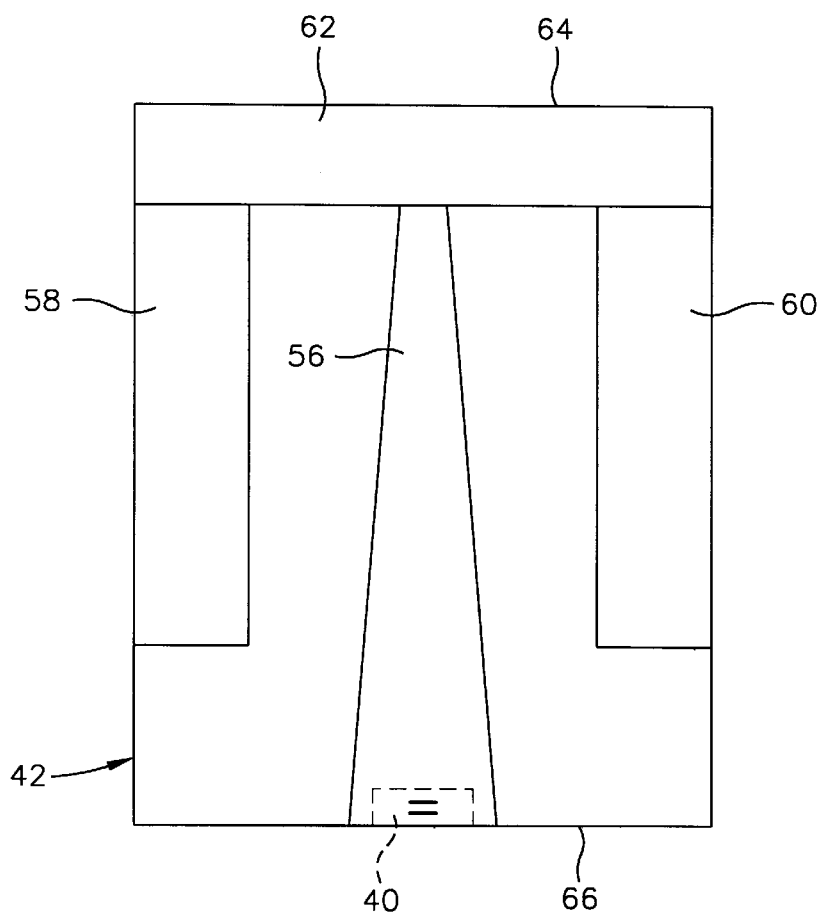
FIG. 5 is an ABS view of the magnetic head taken along plane V—V of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of the merged MR head 40 which has a write head portion 70 and a read head portion 72, the read head portion employing an antiparallel (AP) spin valve sensor 74 of the present invention. FIG. 7 is an ABS view of FIG. 6. The spin valve sensor 74 is sandwiched between first and second gap layers 76 and 78 and the gap layers are sandwiched between first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion of the merged MR head includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads 108 and 110 (see FIGS. 10, 14 and 18 ) from the spin valve sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7.

First Investigation

Figure 9:
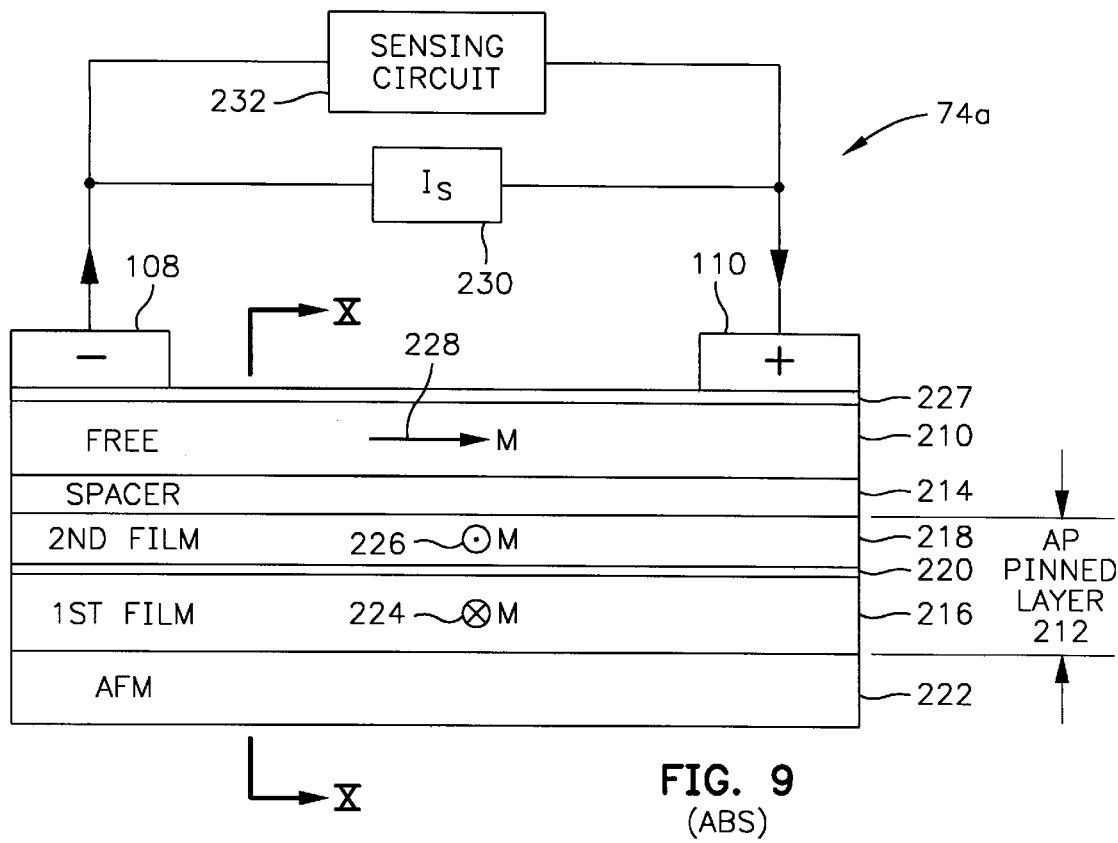
FIG. 9 is an enlarged schematic ABS illustration of a first investigated antiparallel pinned spin valve sensor 74 of FIG. 7 with the sense current $I_S$ in a first direction causing asymmetrical readback signals.
Figure 10:
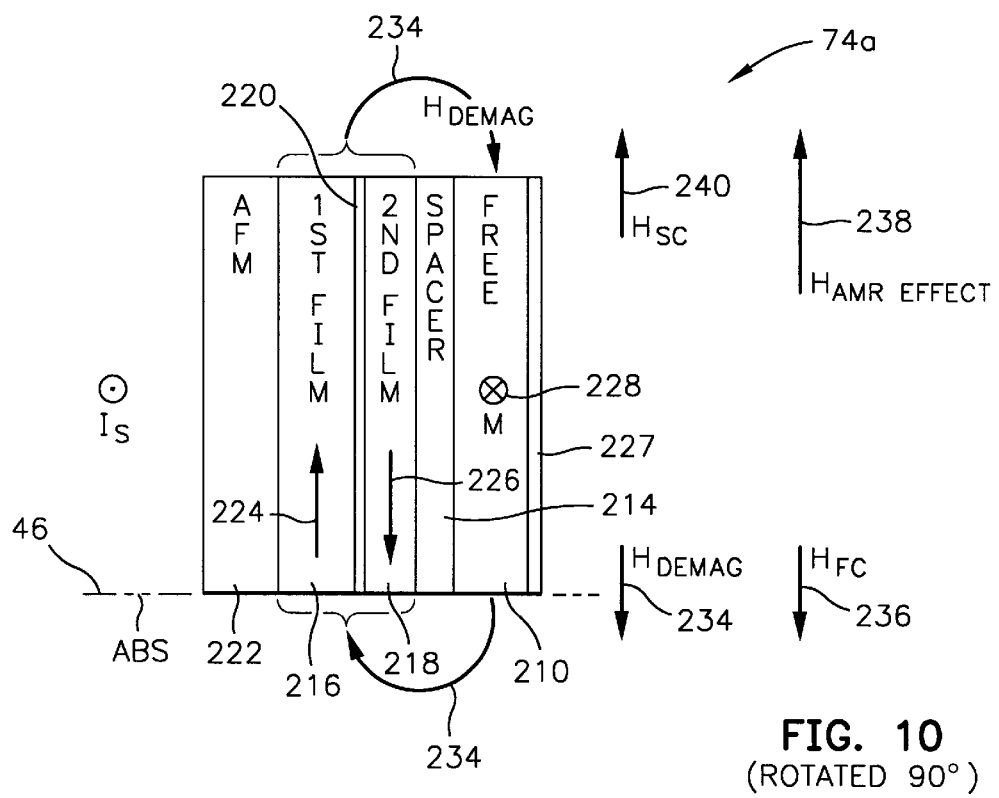
FIG. 10 is a view taken along plane X—X of FIG. 9 rotated 90° clockwise.

The spin valve sensor 74A shown in FIGS. 9 and 10 has a ferromagnetic free layer 210, an antiparallel pinned ferromagnetic layer 212 and a nonmagnetic electrically conductive spacer layer 214. The spacer layer 214 is sandwiched between the free layer 210 and the pinned layer 212. The AP pinned layer 212 differs from the typical spin valve sensor, which employs a single pinned layer, in that the AP pinned layer 212 employs first and second ferromagnetic films 216 and 218 which are separated by a nonmagnetic electrically conductive spacer film 220. The first film 216 has a surface which interfaces with a surface of an antiferromagnetic layer 222 so that the antiferromagnetic layer pins the magnetic moment 224 of the first film in a pinned direction perpendicular to and away from the ABS. The moment of the first film 216 is pinned in this direction by exchange coupling with the antiferromagnetic layer 222. The spacer film 220 is very thin, in the order of 7 Å, which allows an antiferromagnetic exchange coupling between the first and second films 216 and 218. Accordingly, the magnetic moment 226 of the second film is directed in an opposite direction to the magnetic moment 224 of the first film 216, namely perpendicular to and toward the ABS. The thicker of the two films 216 and 218 determines the net magnetic moment of the AP pinned layer 212. The first film 216 has been selected to be the thicker of the two films so that the net magnetic moment is directed perpendicular to and away from the ABS. A capping layer 227 may cover the free layer 210.

The free layer 210 has a magnetic moment 228 which is free to rotate in first and second directions under the influence of field signals (flux incursions) from the rotating disk 34, these field signals being positive and negative going signals which are typically of equal magnitude. The first and second leads 108 and 110 are electrically connected to the sensor 74A with a space therebetween which defines the active region of the sensor as well as the trackwidth of the read head employing the sensor. A sense current source 230 is electrically connected to the first and second leads 108 and 110 for providing a sense current $I_S$ which is conducted through the sensor as shown by the arrows in FIG. 9. In parallel with the sense current source 230 is a sensing circuit 232 for sensing potential changes across the sensor 74A when field signals are induced in the sensor by the rotating disk 34 shown in FIG. 1. The sense current source 230 and the sensing circuit 232 are part of the processing circuitry 48 in FIG. 3.

Each of the layers 210, 214, 216, 218 and 220 conduct a portion of the sense current between the first and second leads 108 and 110. A key parameter in the operation of a spin valve sensor is that the spacer layer 214 have a thickness which is less than the mean free path of conduction electrons flowing in the free and pinned layers 210 and 212. The degree of electron scattering, which depends upon the relative angle between the magnetization 228 of the free layer 210 and the net magnetization (difference between the magnetizations 224 and 226 and which is directed away from the ABS) of the AP pinned layer 212, determines the resistance of the sensor to the sense current $I_S$. The greatest scattering and correspondingly the greatest increase in resistance occurs when the magnetization 228 and the net magnetization of the AP pinned layer 212 are antiparallel and the least scattering and the correspondingly least resistance change occurs when the magnetization 228 and the net magnetization of the AP pinned layer 212 are parallel with respect to one another.

The magnetization 228 of the free layer 210 is preferably oriented near parallel to the ABS so that upon receiving positive and negative field signals from a rotating disk the magnetization 228 rotates upwardly or downwardly to decrease or increase the resistance of the sensor. This would be an opposite situation if the antiferromagnetic layer 222 is set to pin the magnetizations 224 and 226 in directions opposite to that shown in FIG. 10. When the sense current is directed as shown in FIGS. 8 and 9 the transfer curve of the sensor will be shifted relative to a zero bias point by a sense current field $H_{SC}$. As stated hereinabove, the transfer curve of the spin valve sensor is a curve illustrating readback signal of the spin valve sensor versus applied signal from the rotating magnetic disk. The zero bias point is significant from the standpoint that readback signals above and below the zero bias point are positive and negative readback signals. The urgent-felt need in the art is to locate a midpoint of the transfer curve on the zero bias point so as to promote read signal symmetry. This is difficult to accomplish with an AP pinned spin valve because of the many influences on the magnetization of the free layer 210, which influences will be described next.

Various influences on the free layer 210 and consequently various influences on the location of the zero bias point on the transfer curve for the sensor 74A are shown in FIG. 10. The influences on the magnetic moment 228 of the free layer are $H_{demag}$ 234, $H_{FC}$ 236, the AMR EFFECT 238 and $H_{SC}$ 240. $H_{demag}$ 234 is due to the net moment of the AP pinned layer 212, $H_{FC}$ 236 is due to a ferromagnetic coupling between the free layer 210 and the second film 218, the AMR EFFECT 238 is due to an AMR effect which is proportional to the thickness of the free layer 210 and $H_{SC}$ 240 which is the net sense current field on the free layer due to conduction of the sense current $I_S$ through the layers 214, 216, 218 and 220. $H_{demag}$ 234 in an AP pinned spin valve is less than $H_{demag}$ of a single film pinned layer employed in a typical spin valve because of the smaller net pinning moment of the AP pinned layer 212. The advantage of a small $H_{demag}$ in the AP pinned layer 212 is that exchange coupling between the antiferromagnetic layer 222 and the AP pinned layer 212 is increased to promote higher thermal stability of the AP pinned layer. The disadvantage is that $H_{demag}$ of the AP pinned layer 212 does little to counterbalance the AMR EFFECT. In the embodiment shown in FIGS. 9 and 10 $H_{demag}$ and $H_{FC}$ are perpendicular to and toward the ABS while the AMR EFFECT and $H_{SC}$ are directed perpendicular to and away from the ABS. It can be seen that the $H_{SC}$ and the AMR EFFECT will not be balanced by $H_{demag}$ and $H_{FC}$. The direction of $H_{demag}$ and $H_{FC}$ can be reversed by orienting the spins of the antiferromagnetic layer 222 in an opposite direction, however, this would only exacerbate the problem.

It should be noted that the aforementioned influences are all magnetic field influences except for the AMR EFFECT. While the AMR EFFECT is not a magnetic field its influence is the same as a magnetic field from the standpoint of the location of the transfer curve of the spin valve sensor relative to the zero bias point. The AMR EFFECT changes the resistance of the free layer 210, shown in FIG. 10, in the same manner that it changes the resistance of an MR stripe in an AMR sensor. In an AMR sensor the resistance of an MR stripe is at a maximum when the direction of the magnetic moment of the MR stripe is parallel or antiparallel to the direction of a sense current through the MR stripe, and the resistance is at a minimum when the direction of the magnetic moment of the MR stripe is perpendicular to the direction of the sense current. Accordingly, the resistance of the spin valve sensor due to the GMR effect is altered by the resistance due to the AMR EFFECT. This results in a shifting of the transfer curve of the spin valve sensor.

FIG. 10 can be employed for explaining how the transfer curve is shifted. Assuming that a positive magnetic incursion comes from a disk rotating below the ABS 46, the magnetic moment 228 in the free layer 210 will rotate upwardly which increases the resistance of the free layer due to the GMR effect. However, the upward rotation of the magnetic moment 228 causes the resistance of the free layer 210 to be reduced due to the AMR EFFECT. Accordingly, the resistance due to the GMR effect has been lessened by the resistance due to the AMR EFFECT resulting in a reduced positive readback signal. Now assuming that the magnetic disk rotating below the ABS induces a negative magnetic incursion on the spin valve the magnetic moment 228 of the free layer 210 rotates downwardly, decreasing the resistance of the free layer 110 due to the GMR effect and further decreasing the resistance of the layer 110 due to the AMR EFFECT. This results in a larger negative signal. Accordingly, the AMR EFFECT produces a reduced positive signal and a larger negative signal. This shifts the transfer curve of the spin valve sensor downwardly so that the transfer curve is asymmetrical about the zero bias point, which will be described next.

Second Investigation

Figure 11:
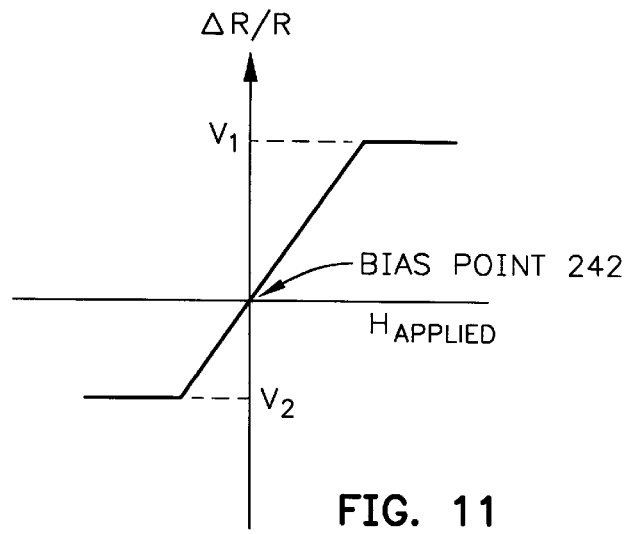
FIG. 11 is a transfer curve for an antiparallel pinned spin valve under the influence of only a sense current field on the free layer.
Figure 12:
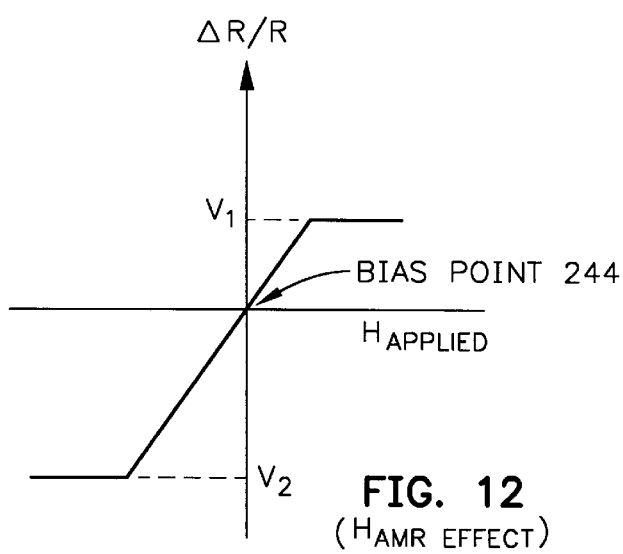
FIG. 12 is the transfer curve for an antiparallel pinned spin valve under the influence of only an AMR effect.
Figure 13:
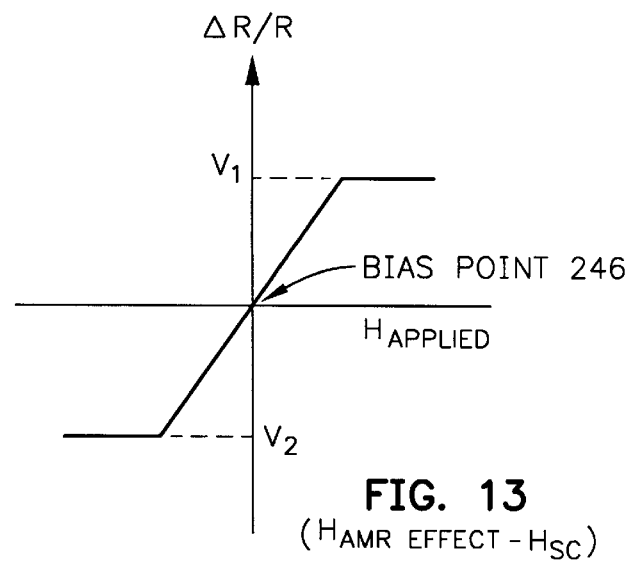
FIG. 13 is a the transfer curve for an antiparallel pinned spin valve where the influence of the sense current field counterbalances the influence of the AMR effect on the free layer so that asymmetry of positive and negative readback signals can be improved.

FIGS. 11, 12 and 13 are exemplary transfer curves for a spin valve sensor shown for the purpose of explaining the influence of sense current field $H_{SC}$ (FIG. 11), the AMR EFFECT (FIG. 12) and the combination of the AMR EFFECT and $H_{SC}$ (FIG. 13) on the bias point of the transfer curve. As shown, each transfer curve is a plot of $H_{applied}$ signals, which are positive and negative flux incursions from the rotating magnetic disk, on the sensor versus the positive and negative readback signal voltages $V_1$ and $V_2$. $\Delta R/R$ is a ratio of the change in magnetoresistance $\Delta R$ of the sensor to resistance of the sensor without any $\Delta R$, this ratio being proportional to the readback signal voltages. If only the sense current field $H_{SC}$ is considered, as shown in FIG. 11, the positive and negative read signals $V_1$ and $V_2$ are asymmetrical with respect to a zero bias point 242 with the positive read signal $V_1$ being greater than the negative $V_2$. If only the AMR EFFECT is considered, as shown in FIG. 12, the readback signals $V_1$ and $V_2$ are asymmetrical with respect to the bias point 244 with the negative readback signal $V_2$ being greater than the positive readback signal $V_1$. FIGS. 11 and 12 demonstrate that when the sense current $I_S$ is appropriately directed, as shown in FIG. 13, the influence of the AMR EFFECT location of the transfer curve relative to the bias point can be counterbalanced as shown in FIG. 13. In FIG. 13 the sense current field $H_{SC}$ is subtracted from the AMR EFFECT to produce a zero influence on the transfer curve so that the positive and negative readback signals $V_1$ and $V_2$ are symmetrical with respect to the bias point 246. Accordingly, by appropriately directing the sense current $I_S$ with a predetermined magnitude readback signal asymmetry can be improved.

Figure 14:
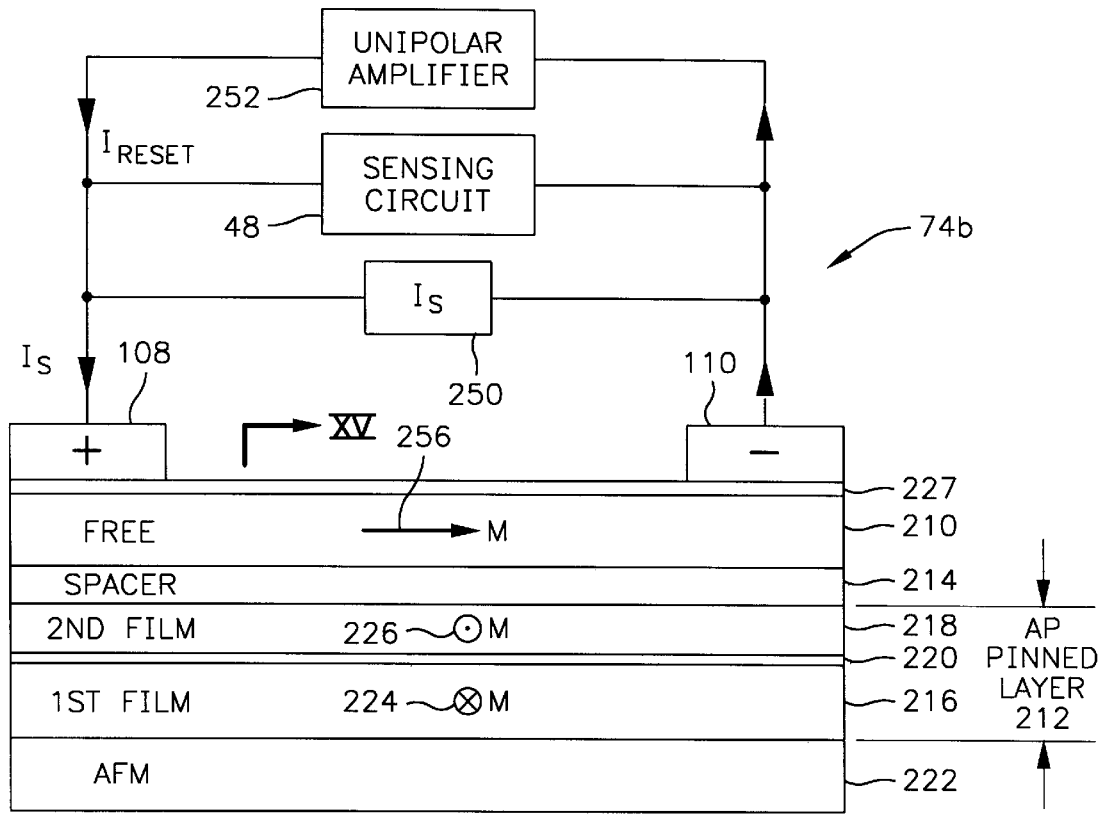
FIG. 14 is an enlarged schematic illustration of a second investigated antiparallel pinned spin valve sensor 74 of FIG. 7 with the sense current $I_S$ directed in a second direction which causes near symmetrical readback signals.
Figure 15:
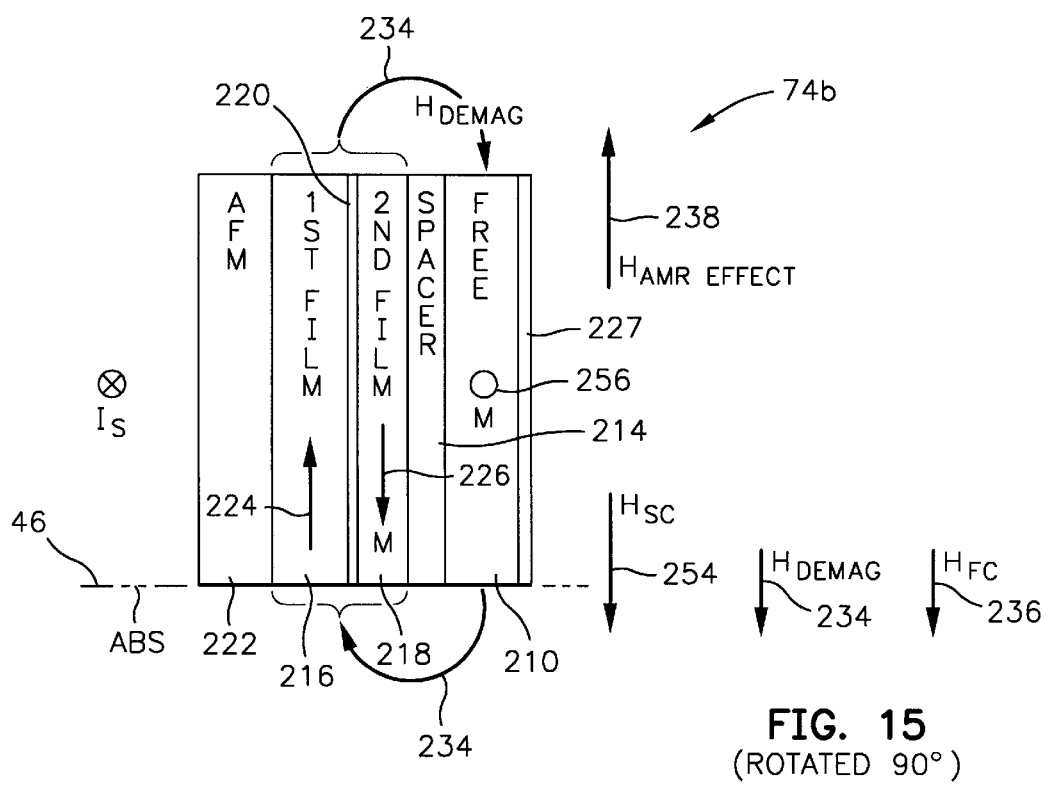
FIG. 15 is a view taken along plane XV—XV of FIG. 14 rotated 90° clockwise.

The AP pinned spin valve sensor 74B shown in FIGS. 14 and 15 is the same as the AP pinned spin valve sensor 74A shown in FIGS. 9 and 10, except a sense current source 250 is provided for directing the sense current in an opposite direction to that shown in FIG. 9 and a unipolar amplifier 252 is employed for purposes to be described hereinafter. When the sense current is directed, as shown by the arrows in FIG. 14, the sense current field $H_{SC}$ 254 is directed opposite to the AMR EFFECT 238 so that $H_{SC}$, $H_{demag}$ and $H_{FC}$ counterbalance the AMR EFFECT to reduce the aforementioned asymmetry. This is accomplished by directing $I_S$ from the current source 250 in the appropriate direction and of a sufficient magnitude to implement the counterbalancing. In testing the AP pinned valve sensor 74A in FIGS. 9 and 10, the asymmetry was –40% where asymmetry is defined as $$\frac{V_1 - V_2}{\max(V_1 \text{ or } V_2)}.$$

Figure 17:
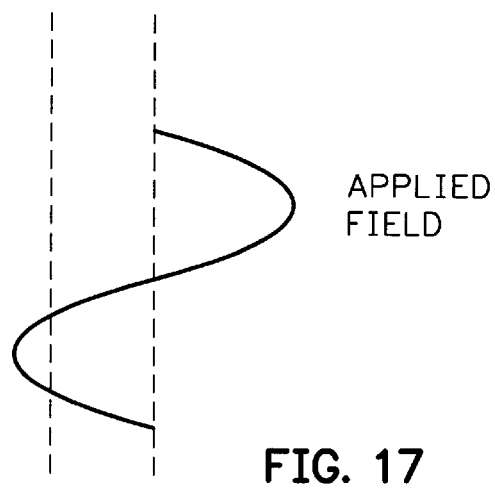
FIG. 17 is an applied signal curve that produces the curves shown in FIG. 16.

In testing the AP pinned valve sensor 74B the asymmetry was +10% which is shown by an exaggerated positive signal in FIG. 16 about a bias point 255 in response to an applied field as shown in FIG. 17. FIG. 16 also shows that the negative portion of the output signal may be clipped short of its full negative potential when there is asymmetry. It should be noted that when the sense current field $H_{SC}$ is employed to counterbalance the AMR EFFECT the magnetic moment 256 of the free layer 210 may not be parallel to the ABS as indicated by the open circle in FIG. 15.

Another advantage of the spin valve sensor 74B is that the sense current through the free layer 210 will cause a sense current field which is imposed on and increases the magnetic strength of the pinning moment 224 of the first film 216. This will promote thermal stability of the sensor from the standpoint that high temperature incursions due to contact of the head with asperities on the rotating disk will not disorient the antiferromagnetic layer 222 unless some event causes the temperature to exceed the aforementioned blocking temperature of the antiferromagnetic layer 222. However, should the blocking temperature be exceeded, I have provided the unipolar amplifier 252 for resetting the orientation of the antiferromagnetic layer 222 by conducting a resetting current through the antiferromagnetic layer 222. This current is of a higher magnitude than the sense current $I_S$ and typically would be three times $I_S$ for a very short period of time, such as 30 nanoseconds, to avoid overheating the antiferromagnetic layer 222. It should be noted that the direction of the reset current $I_{reset}$ is in the same direction as the sense current $I_S$.

Third Investigation-The Invention

The second investigation resulted in filing my aforementioned copending patent application. As stated in that application testing of the AP pinned spin valve in the first investigation showed –40% readback asymmetry and testing of the AP pinned spin valve in the second investigation showed +10% readback asymmetry where asymmetry is defined as $$\frac{V_1 - V_2}{\max(V_1 \text{ or } V_2)}.$$

The readback asymmetry of the sensor resulting from the second investigation was a significant improvement over the sensor investigated in the first investigation. As discussed hereinabove the +10% readback asymmetry of the sensor can impact the magnetic stability of the free layer in some applications where the applied signals are close to saturating the free layer. When the free layer is driven into saturation a single magnetic domain free layer can be broken up into multiple domains that shift around to change the magnetic properties of the free layer and consequently the readback output of the AP pinned spin valve sensor. My third investigation provides an arrangement for reducing the +10% readback asymmetry to near zero, thus improving the magnetic stability of the free layer.

Figure 18:
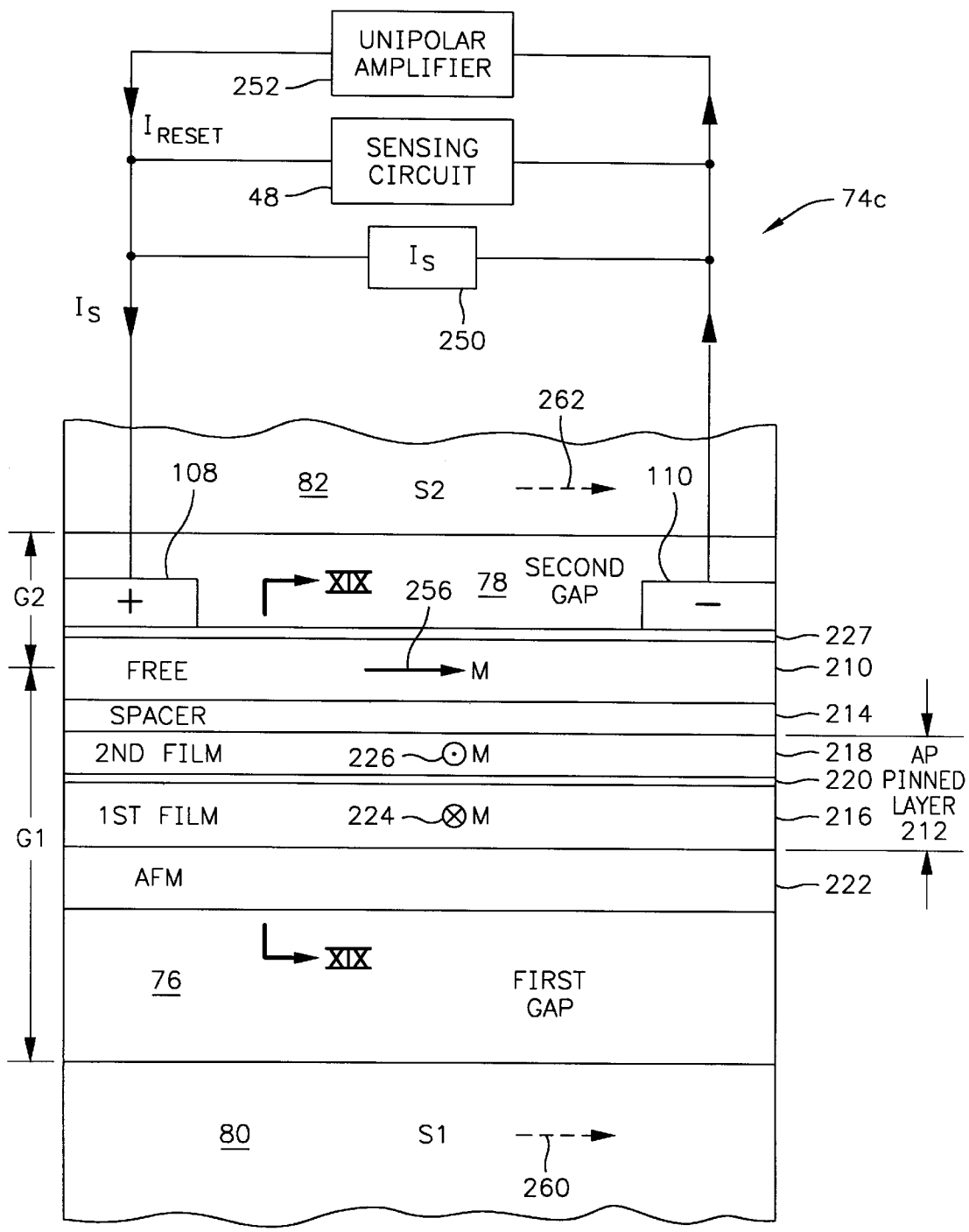
FIG. 18 is an ABS illustration of the present AP pinned spin valve sensor with accompanying circuitry shown in block form.
Figure 19:
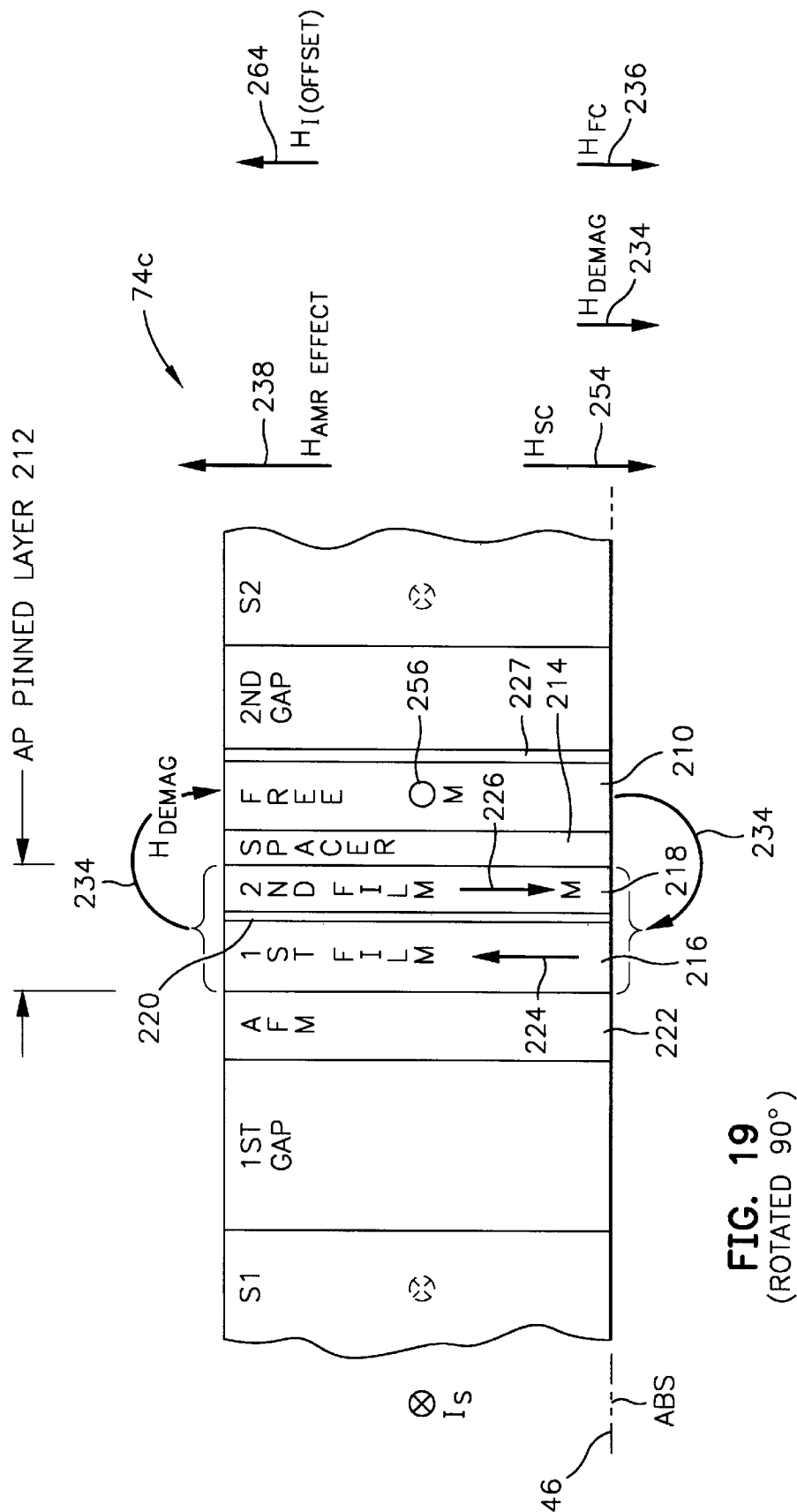
FIG. 19 is a view taken along plane XIX—XIX of FIG. 18.
Figure 20:
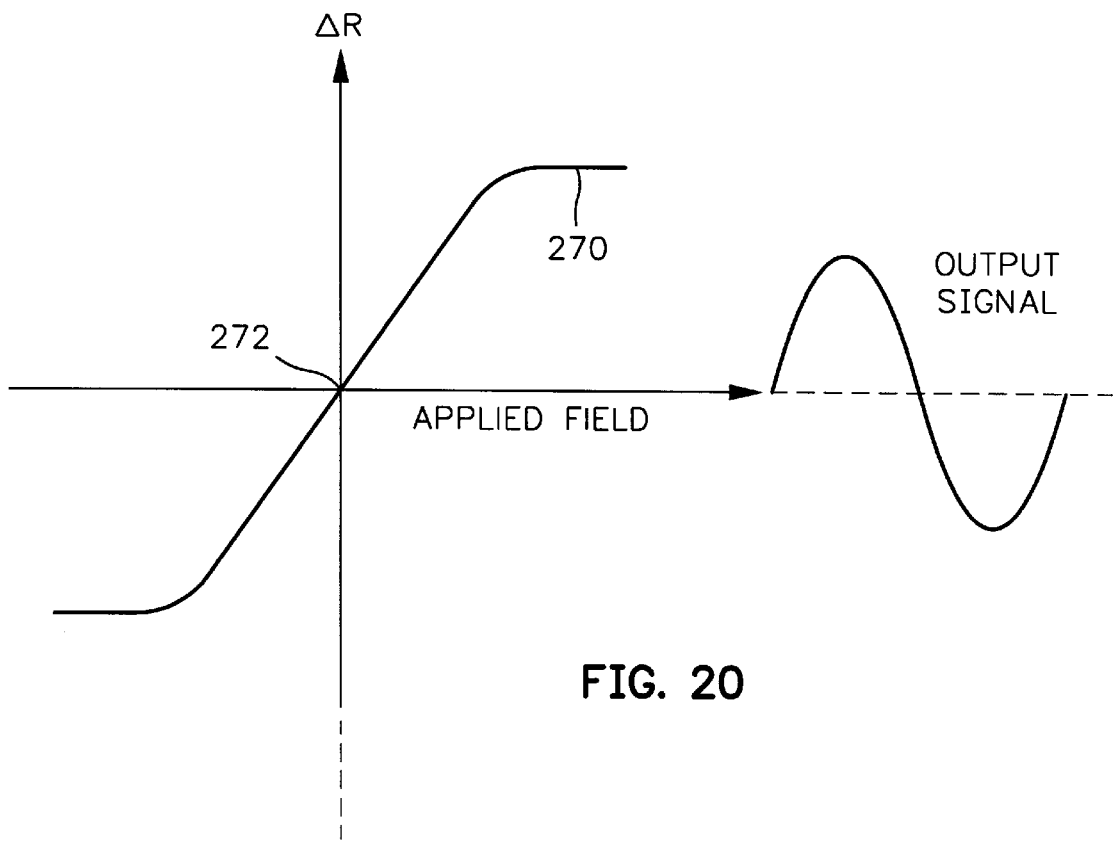
FIG. 20 is a transfer curve and output readback signal curve for the present AP pinned spin valve sensor shown in FIGS. 18 and 19.
Figure 21:
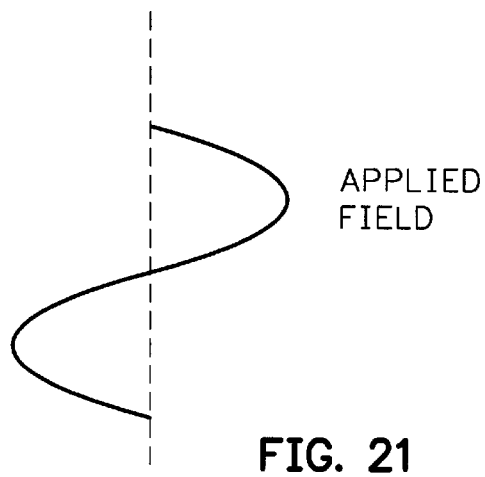
FIG. 21 is an applied signal curve that produces the curves shown in FIG. 20.

I have accomplished this by asymmetrically locating the free layer within the gap length of the read head as shown in FIGS. 18 and 19. The gap length is the distance between the first and second shield layers and is determined by the thicknesses of the first and second gap layers. When the sense current $I_S$ is applied to the read head as shown in FIGS. 18 and 19 image sense currents 260 and 262 are manifested in the first and second shield layers 80 and 82. Each of these image sense currents causes an image sense current field (as determined by the right hand rule) which traverses the free layer 210 substantially perpendicular to the ABS. In my preferred embodiment the second gap layer 78 is thinner than the first gap layer 76 so that the free layer 210 is closer to the second shield layer 82 than it is to the first shield layer 80. With this arrangement there is a net image sense current field 262 that traverses the free layer 210 to counterbalance the net influence on the free layer due to sense current field $H_{SC}$, demag field from the AP pinned layer 212 $H_{DEMAG}$, ferromagnetic coupling field between second film 218 of AP pinned layer $H_{FC}$ and effect on the magnetism of the free layer due to the AMR effect $H_{AMR\ EFFECT}$. In the preferred embodiment $H_{SC}$, $H_{DEMAG}$, and $H_{FC}$ are perpendicular to and toward the ABS while the $H_{AMR\ EFFECT}$ and $H_{I(OFFSET)}$ 264 are perpendicular to and away from the ABS. When all of the forces acting on the free layer 210 are balanced to zero the transfer curve 270 of the AP pinned spin valve sensor 74C, shown in FIGS. 18 and 19, is symmetrically located with respect to the bias point 272 in response to an applied signal 274 as shown in FIG. 21. Otherwise stated, the bias point 272 is located midway between the positive and negative values along the ordinate of the transfer curve 270. FIG. 20 also shows the readback signal without any clipping of the positive and negative values.

My third investigation showed that a 0.2% decrease in the asymmetry stability sigma can be achieved by a 1% decrease in the readback asymmetry. Since this relationship is linear, if the +10% readback asymmetry is reduced to zero the asymmetry stability sigma will be reduced by 2%. My investigation also showed that magnetic stability of the free layer 210 is less when the readback asymmetry is negative instead of positive. This means that the free layer is less stable when the readback asymmetry is +10% then when the readback asymmetry is –10%. Accordingly, in my preferred embodiment the readback asymmetry is near zero or slightly negative, such as –2%.

An example of the present AP pinned spin valve sensor 74D that was tested for its results is shown in FIG. 22. This embodiment is the same as that shown in FIGS. 18 and 19 except the AP pinned spin valve sensor has a third thin film 280 which is located between and interfacially engages the first film 216 and the AFM layer 222. The third layer 280 is NiFe which provides a better exchange coupling between the NiO AFM layer 222 and the Co first film. The sensor 74D had the following parameters:

| Layer | Material | Thickness |
|---|---|---|
| First shield layer 80 | NiFe | |
| First gap layer 76 | Al$_2$O$_3$ | 0.1 μm − 20 nm |
| AFM layer 222 | NiO | 425 Å |
| Third film 280 | NiFe | 10 Å |
| First film 216 | Co | 24 Å |
| Spacer 220 | Ru | 6 Å |
| Second film 218 | Cu | 24 Å |
| Spacer 214 | Co | 22 Å |
| Free layer 210 | NiFe | 72 Å |
| Capping layer 127 | Ta | 50 Å |
| Second gap layer 78 | Al$_2$O$_3$ | 0.1 μm + 20 nm |
| Gap length | | 0.2 μm |

The sense current was 6 ma. By reducing the thickness of the second gap layer 78 by 20 nm and increasing the thickness of the first gap layer 76 by 20 nm I found an 8% reduction in readback asymmetry and a corresponding 1.5% reduction in the standard deviation of the magnetic instability. It is obvious from the above teaching that the thicknesses of the first and second gap layers 76 and 78 can be sized to obtain near zero readback asymmetry or slightly negative readback asymmetry as desired. The result is an improvement in the magnetic stability of the free layer 210.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head that has an air bearing surface (ABS) comprising:
   a spin valve sensor;
   first and second leads for conducting a sense current through the spin valve sensor in a direction substantially parallel to the ABS;
   first and second gap layers;
   the spin valve sensor being sandwiched between the first and second gap layers;
   first and second shield layers;
   the first and second gap layers being sandwiched between the first and second shield layers;
   the spin valve sensor including:
      a free layer an antiparallel (AP) pinned layer and a nonmagnetic electrically conductive spacer layer;
   the AP pinned layer including:
      first and second ferromagnetic thin films and a nonmagnetic electrically conductive spacer film;
      the spacer film being sandwiched between the first and second films;
      an antiferromagnetic layer adjacent said first thin film which pins a magnetic moment of the AP pinned layer along a pinned direction;
   the spacer layer being sandwiched between the free layer and the pinned layer so that a magnitude of an angle between directions of magnetic moments of the free and pinned layers changes a magnetoresistance of the sensor in response to magnetic incursions from a moving magnetic medium; and
   the first and second gap layers being sized so that the free layer of the sensor is located closer to one of the first and second shield layers than to the other of the first and second shield layers so that a net image sense current field from the shield layers promotes magnetic stability of the free layer.

2. A magnetic head as claimed in claim 1 wherein, upon conducting the sense current through the sensor, the net image sense current field is directed across the free layer antiparallel to a direction of a sense current field across the free layer, the sense current field being due to conduction of the sense current through all electrically conductive layers of the sensor other than the free layer.

3. A magnetic head as claimed in claim 2 wherein the second gap layer is thinner than the first gap layer so that the free layer is closer to the second shield layer than it is to the first shield layer.

4. A magnetic head as claimed in claim 3 wherein the net image sense current field locates a transfer curve of the sensor substantially symmetrically with respect to a bias point on the transfer curve.

5. A magnetic head as claimed in claim 4 including:
   the magnetic moment of the pinned layer being directed perpendicular to the ABS;
   the magnetic moment of the free layer being directed nonperpendicular to the ABS to a neutral position when the sensor is receiving the sense current but is not receiving magnetic incursions from the moving magnetic medium; and
   the magnetic moment of the free layer rotating in first and second directions from the neutral position when the sensor receives positive and negative magnetic incursions from the moving magnetic medium.

6. A magnetic head as claimed in claim 5 comprising:
   a write head including:
      at least one coil layer and an insulation stack;
      the coil layer being embedded in the insulation stack;
      first and second pole pieces connected at a back gap and having pole tips with edges forming a portion of an air bearing surface (ABS);
      the insulation stack being sandwiched between the first and second pole pieces;
      a write gap layer sandwiched between the pole tips of the first and second pole pieces and forming a portion of the ABS; and
      the first pole piece and the second shield layer being a common layer.

7. A magnetic disk drive comprising:
   a write head including:
      at least one coil layer and an insulation stack;
      the coil layer being embedded in the insulation stack;
      first and second pole pieces connected at a back gap and having pole tips with edges forming a portion of an air bearing surface (ABS);
      the insulation stack being sandwiched between the first and second pole pieces; and
      a write gap layer sandwiched between the pole tips of the first and second pole pieces and forming a portion of the ABS;
   a read head including:
      a spin valve sensor, first and second gap layers and first and second shield layers; and
      the spin valve sensor being sandwiched between the first and second gap layers and the first and second gap layers being sandwiched between the first and second shield layers:
   the spin valve sensor including:
      a free layer, an antiparallel (AP) pinned layer and a nonmagnetic electrically conductive spacer layer;

the AP pinned layer including:
- first and second ferromagnetic thin films and a nonmagnetic electrically conductive spacer film;
- the spacer film being sandwiched between the first and second films;
- an antiferromagnetic layer adjacent said first thin film which pins a magnetic moment of the AP pinned layer along a pinned direction;
- the spacer layer being sandwiched between the free layer and the pinned layer so that a magnitude of an angle between directions of magnetic moments of the free and pinned layers changes a magnetoresistance of the sensor in response to magnetic incursions from a moving magnetic medium; and
- the first and second gap layers being sized so that the free layer of the sensor is located closer to one of the first and second shield layers than to the other shield layer so that a net image sense current field from the shield layers promotes magnetic stability of the free layer;

the write head and the read head being adjacent one another to form a combined magnetic head;

a frame;

a magnetic disk rotatably supported on the frame;

a support mounted on the frame for supporting the head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

8. A magnetic head as claimed in claim 7 wherein the second gap layer is thinner than the first gap layer so that the free layer is closer to the second shield layer than it is to the first shield layer.

9. A magnetic head as claimed in claim 8 wherein, upon conducting the sense current through the sensor, the net image sense current field is directed across the free layer antiparallel to a direction of a sense current field across the free layer, the sense current field being due to conduction of the sense current through all electrically conductive layers of the sensor other than the free layer.

10. A magnetic head as claimed in claim 9 wherein the net image sense current field locates a transfer curve of the sensor substantially symmetrically with respect to a bias point on the transfer curve.

11. A magnetic head as claimed in claim 10 including:
- the magnetic moment of the pinned layer being directed perpendicular to the ABS;
- the magnetic moment of the free layer being directed nonperpendicular to the ABS to a neutral position when the sensor is receiving the sense current but is not receiving magnetic incursions from the moving magnetic medium; and
- the magnetic moment of the free layer rotating in first and second directions from the neutral position when the sensor receives positive and negative magnetic incursions from the moving magnetic medium.

12. A magnetic head having an air bearing surface (ABS) comprising:

an antiparallel (AP) pinned spin valve sensor;

first and second lead layers connected to the sensor in a spaced relationship for conducting a sense current through the sensor in a direction which is substantially parallel to the ABS so that when the sensor receives positive and negative magnetic incursions of equal magnitude from a moving magnetic medium a change in magnetoresistance of the sensor enables opposite polarity signals to be detected about a bias point of a transfer curve of the sensor;

first and second gap layers;

the sensor and the lead layers being sandwiched between the first and second gap layers;

first and second shield layers;

the first and second gap layers being sandwiched between the first and second shield layers with a distance between the shield layers at the ABS defining a gap length;

the sensor including:
- a ferromagnetic free layer having a magnetic moment which is free to rotate in first and second directions from a neutral position upon sensing said magnetic incursions, the zero position corresponding to said neutral bias point;
- an antiparallel pinned layer;
- an antiferromagnetic layer adjacent said antiparallel pinned layer which pins a magnetic moment of the antiparallel pinned layer along a pinned direction;
- an electrically conductive nonmagnetic spacer layer sandwiched between the free layer and the antiparallel pinned layer so that, upon receiving said magnetic incursions, the magnetic moment of the free layer rotates in said first and second directions relative to said pinned direction, thus causing a change in said magnetoresistance; and
- the free layer being asymmetrically located within said gap length so that when the sensor is receiving the sense current the free layer is magnetically biased by a net image sense current field from the shield layers promotes magnetic stability of the free layer to move the direction of the magnetic moment of the free layer toward a position that will, in turn, move the bias point toward a midpoint on the transfer curve of the sensor.

13. A magnetic head as claimed in claim 12 including:

the AP pinned layer including:
- first and second ferromagnetic thin films and a nonmagnetic electrically conductive spacer film; and
- the spacer film being sandwiched between the first and second films; and
- an antiferromagnetic layer adjacent said first thin film which pins a magnetic moment of the AP pinned layer along a pinned direction.

14. A magnetic head as claimed in claim 13 wherein the second gap layer is thinner than the first gap layer so that the free layer is closer to the second shield layer than it is to the first shield layer.

15. A magnetic head as claimed in claim 14 comprising:

a write head including:
- at least one coil layer and an insulation stack;
- the coil layer being embedded in the insulation stack;
- first and second pole pieces connected at a back gap and having pole tips with edges forming a portion of an air bearing surface (ABS);

the insulation stack being sandwiched between the first and second pole pieces;

a write gap layer sandwiched between the pole tips of the first and second pole pieces and forming a portion of the ABS; and the first pole piece and the second shield layer being a common layer.

16. A magnetic head as claimed in claim 15 wherein, upon conducting the sense current through the sensor, the net image sense current field is directed across the free layer antiparallel to a direction of a sense current field across the free layer, the sense current field being due to conduction of the sense current through all electrically conductive layers of the sensor other than the free layer.

17. A magnetic head as claimed in claim 16 wherein the net image sense current field locates a transfer curve of the sensor substantially symmetrically with respect to a bias point on the transfer curve.

18. A magnetic head as claimed in claim 17 including:

the magnetic moment of the pinned layer being directed perpendicular to the ABS;

the magnetic moment of the free layer being directed nonperpendicular to the ABS to a neutral position when the sensor is receiving the sense current but is not receiving magnetic incursions from the moving magnetic medium; and the magnetic moment of the free layer rotating in first and second directions from the neutral position when the sensor receives positive and negative magnetic incursions from the moving magnetic medium.

19. A magnetic head having an air bearing surface (ABS) comprising:

an antiparallel (AP) pinned spin valve sensor which has positive and negative read signal symmetry about a zero bias point of a transfer curve upon sensing positive and negative magnetic incursions of equal magnitude from a moving magnetic medium;

first and second lead layers connected to the sensor in a spaced relationship for conducting a sense current through the sensor in a direction which is substantially parallel to the ABS;

first and second gap layers;

the sensor and the lead layers being sandwiched between the first and second gap layers;

first and second shield layers;

the first and second gap layers being sandwiched between the first and second shield layers with a distance between the shield layers at the ABS defining a gap length;

the sensor including:

a ferromagnetic free layer having a magnetic moment which is free to rotate in first and second directions from a neutral position upon sensing said positive and negative magnetic incursions respectively, the neutral position corresponding to said zero bias point;

an AP pinned layer having a magnetic moment which is pinned in a pinned direction;

the AP pinned layer including:

first and second ferromagnetic thin films and a nonmagnetic electrically conductive spacer film; and the spacer film being sandwiched between the first and second films so as to enable magnetic moments of the first and second ferromagnetic thin films to be antiparallel with respect to one another;

an antiferromagnetic layer adjacent said first thin film which pins the magnetic moment of the first thin film along a direction which, in turn, pins the magnetic moment of the second ferromagnetic thin film along said pinned direction;

a nonmagnetic electrically conductive spacer layer sandwiched between the free layer and the pinned layer so that upon sensing said positive and negative magnetic incursions the magnetic moment of the free layer rotates in said first and second directions relative to the pinned direction of the magnetic moment of the pinned layer resulting in an increase or decrease in magnetoresistance respectively of the sensor to a sense current;

the direction of the magnetic moment of the free layer and thus a location of a bias point on a transfer curve of the sensor being influenced by a ferromagnetic coupling field ($H_{FC}$) from said second film of the pinned layer, a demagnetization field ($H_{demag}$) from the pinned layer, an anisotropic magnetoresistance effect (AMR EFFECT) and, upon applying said sense current, a net sense current field ($H_{SC}$) due to fields from electrically conductive layers of the sensor other than the free layer; and the free layer being asymmetrically located within said gap length so that when the sensor is receiving the sense current the free layer is magnetically biased by a net image current field from the shield layers to move the direction of the magnetic moment of the free layer in a direction which locates the transfer curve substantially symmetrically with respect to the zero bias point.

20. A magnetic head as claimed in claim 19 wherein the AMR EFFECT and the net image sense current field have an influence on the free layer which is substantially equivalent to a magnetic field which is antiparallel to the direction of the fields $H_{FC}$, $H_{demag}$ and $H_{SC}$ when the sense current is conducted through the sensor.

21. A magnetic head as claimed in claim 20 wherein the second gap layer is thinner than the first gap layer so that the free layer is closer to the second shield layer than it is to the first shield layer.

22. A magnetic head as claimed in claim 21 comprising:

a write head including:

at least one coil layer and an insulation stack;

the coil layer being embedded in the insulation stack;

first and second pole pieces connected at a back gap and having pole tips with edges forming a portion of an air bearing surface (ABS);

the insulation stack being sandwiched between the first and second pole pieces;

a write gap layer sandwiched between the pole tips of the first and second pole pieces and forming a portion of the ABS; and the first pole piece and the second shield layer being a common layer.

23. A magnetic head as claimed in claim 22 wherein the direction of the fields $H_{FC}$ and $H_{demag}$ are perpendicular to and toward the air bearing surface (ABS) and the direction of the influence of the AMR EFFECT and the net image sense current field are perpendicular to and away from the ABS.

24. A magnetic head as claimed in claim 23 including:

the magnetic moment of the pinned layer being directed perpendicular to the ABS;

the magnetic moment of the free layer being directed nonperpendicular to the ABS to said neutral position when the sensor is receiving the sense current but is not receiving magnetic incursions from the moving magnetic medium; and the magnetic moment of the free layer rotating in first and second directions from the neutral position when the sensor receives positive and negative magnetic incursions from the moving magnetic medium.

25. A magnetic disk drive comprising:

a write head including:
   at least one coil layer and an insulation stack;
   the coil layer being embedded in the insulation stack;
   first and second pole pieces connected at a back gap and having pole tips with edges forming a portion of an air bearing surface (ABS);
   the insulation stack being sandwiched between the first and second pole pieces; and
   a write gap layer sandwiched between the pole tips of the first and second pole pieces and forming a portion of the ABS;

a read head including:
   an antiparallel (AP) pinned spin valve sensor;
   first and second lead layers connected to the sensor in a spaced relationship for conducting a sense current through the sensor in a direction which is substantially parallel to the ABS so that when the sensor receives positive and negative magnetic incursions of equal magnitude from a moving magnetic medium a change in magnetoresistance of the sensor enables opposite polarity signals to be detected about a zero bias point on a transfer curve of the sensor;
   first and second gap layers;
   the sensor and the lead layers being sandwiched between the first and second gap layers;
   first and second shield layers;
   the first and second gap layers being sandwiched between the first and second shield layers with a distance between the shield layers at the ABS defining a gap length;

the sensor including:
   a ferromagnetic free layer having a magnetic moment which is free to rotate in first and second directions from a neutral position upon sensing said magnetic incursions, the neutral position corresponding to said zero bias point;

an AP pinned layer including:
   first and second ferromagnetic thin films and a nonmagnetic electrically conductive spacer film; and
   the spacer film being sandwiched between the first and second films so as to enable magnetic moments of the first and second ferromagnetic thin films to be antiparallel with respect to one another;

an antiferromagnetic layer adjacent said first thin film which pins the magnetic moment of the first thin film along a direction which, in turn, pins the magnetic moment of the second ferromagnetic thin film along said pinned direction;

a nonmagnetic electrically conductive spacer layer sandwiched between the free layer and the pinned layer so that upon sensing said positive and negative magnetic incursions the magnetic moment of the free layer rotates in said first and second directions relative to the pinned direction of the magnetic moment of the pinned layer resulting in an increase or decrease in magnetoresistance respectively of the sensor to a sense current;

a sense current source for applying said sense current to the leads of the sensor;

the direction of the magnetic moment of the free layer and thus a location of the bias point on the transfer curve being influenced by a ferromagnetic coupling field ($H_{FC}$) from said second film of the pinned layer, a demagnetization field ($H_{demag}$) from the pinned layer, an anisotropic magnetoresistance effect (AMR EFFECT) and, upon applying said sense current, a net sense current field ($H_{SC}$) due to fields from electrically conductive layers of the sensor other than the free layer;

the free layer being asymmetrically located within said gap length so that when the sensor is receiving the sense current the free layer is magnetically biased by a net image current field from the shield layers to move the direction of the magnetic moment of the free layer in a direction which locates the transfer curve substantially symmetrically with respect to the zero bias point;

the write head and the read head being adjacent one another to form a combined magnetic head;

a frame;

a magnetic disk rotatably supported on the frame;

a support mounted on the frame for supporting the head in a transducing relationship with the magnetic disk;

means for rotating the magnetic disk;

positioning means connected to the support for moving the combined magnetic head to multiple positions with respect to said magnetic disk; and means connected to the combined magnetic head, to the means for rotating the magnetic disk and to the positioning means for exchanging signals with the combined magnetic head, for controlling movement of the magnetic disk and for controlling the position of the combined magnetic head.

26. A magnetic head as claimed in claim 25 wherein the AMR EFFECT and the net image sense current field have an influence on the free layer which is equivalent to a magnetic field which is antiparallel to the direction of the fields $H_{FC}$, $H_{demag}$ and $H_{SC}$ when the sense current is conducted through the sensor.

27. A magnetic head as claimed in claim 26 wherein the second gap layer is thinner than the first gap layer so that the free layer is closer to the second shield layer than it is to the first shield layer.

28. A magnetic head as claimed in claim 27 wherein the direction of the fields $H_{FC}$ and $H_{demag}$ are perpendicular to and toward the air bearing surface (ABS) and the direction of the influence of the AMR EFFECT and the net image sense current field are perpendicular to and away from the ABS.

29. A magnetic head as claimed in claim 28 including:
   the magnetic moment of the pinned layer being directed perpendicular to the ABS;
   the magnetic moment of the free layer being directed nonperpendicular to the ABS to said neutral position when the sensor is receiving the sense current but is not receiving magnetic incursions from the moving magnetic medium; and
   the magnetic moment of the free layer rotating in first and second directions from the neutral position when the sensor receives positive and negative magnetic incursions from the moving magnetic medium.

30. A method of making a magnetic head that has an air bearing surface (ABS) comprising the unordered steps of:
   making an antiparallel (AP) spin valve sensor by the unordered steps of forming a nonmagnetic electrically conductive spacer layer between a ferromagnetic free layer and a ferromagnetic Al) pinned layer;

making the AP pinned layer by the unordered steps of forming a nonmagnetic nonconductive spacer film between first and second ferromagnetic thin films; and forming an antiferromagnetic layer adjacent the first ferromagnetic film for pinning a direction of a magnetic moment of the AP pinned layer;

forming the spin layer between first and second gap layers;

forming the first and second gap layers between first and second shield layers; and making one of the first and second gap layers thinner than the other one of the first and second gap layers so that the free layer is closer to one of the first and second shield layers than to the other one of the first and second shield layers.

31. A method as claimed in claim 30 including:

sizing the thicknesses of the first and second gap layers so that a bias point on a transfer curve of the sensor is substantially centered on said transfer curve.

32. A method as claimed in claim 30 including the step of:

forming the second gap layer thinner than the first gap layer so that the free layer is closer to the second shield layer than it is to the first shield layer.

* * * * *